United States Patent
Alcorn et al.

(10) Patent No.: US 10,528,209 B2
(45) Date of Patent: Jan. 7, 2020

(54) DISPLAYING INDICATOR WHEN DATA OF CELL THAT IS NOT VISIBLE CHANGES

(71) Applicant: Lenovo Enterprise Solutions (Singapore) PTE. LTD., New Tech Park (SG)

(72) Inventors: Matthew Robert Alcorn, Durham, NC (US); Joseph Vincent DiCecco, Rochester, MN (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 617 days.

(21) Appl. No.: 14/831,108

(22) Filed: Aug. 20, 2015

(65) Prior Publication Data

US 2017/0052649 A1    Feb. 23, 2017

(51) Int. Cl.
| | |
|---|---|
| *G06F 3/00* | (2006.01) |
| *G06F 3/0481* | (2013.01) |
| *G06F 3/0484* | (2013.01) |
| *G06F 3/0485* | (2013.01) |
| *G06F 3/048* | (2013.01) |

(52) U.S. Cl.
CPC ............ *G06F 3/0481* (2013.01); *G06F 3/048* (2013.01); *G06F 3/0485* (2013.01); *G06F 3/04842* (2013.01); *G06F 3/04847* (2013.01)

(58) Field of Classification Search
CPC .... G06F 3/048; G06F 3/0481; G06F 3/04842; G06F 3/0485; G06F 3/04847
See application file for complete search history.

(56) References Cited

U.S. PATENT DOCUMENTS

| | | | | |
|---|---|---|---|---|
| 5,247,611 A * | 9/1993 | Norden-Paul | ......... | G06F 17/243 345/156 |
| 5,893,123 A * | 4/1999 | Tuinenga | ............... | G06F 17/246 715/209 |
| 6,225,996 B1 * | 5/2001 | Gibb | ...................... | G06F 17/246 715/209 |
| 7,831,902 B2 * | 11/2010 | Sourov | ................... | G06Q 10/06 715/220 |
| 8,719,689 B2 * | 5/2014 | Glaser-Seidnitzer | ........................ | G06F 3/0482 715/212 |
| 9,043,722 B1 * | 5/2015 | Holt | ..................... | G06F 3/04842 715/781 |
| 9,330,080 B2 * | 5/2016 | Muenkel | ............ | G06F 17/30424 |
| 2002/0004801 A1 * | 1/2002 | Todd | ...................... | G06F 17/246 715/212 |
| 2002/0023105 A1 * | 2/2002 | Wisniewski | ............ | G06F 17/246 715/212 |
| 2003/0156124 A1 * | 8/2003 | Good | ..................... | G06F 3/0481 345/620 |

(Continued)

*Primary Examiner* — Kieu D Vu
*Assistant Examiner* — Andrew Chung
(74) *Attorney, Agent, or Firm* — Kunzler Bean & Adamson, PC; Bruce R. Needham (57) ABSTRACT

A sub-grid of a grid of data is displayed on a display device. The data is organized over cells. The cells within the sub-table are visible on the display device, whereas the cells outside the sub-table are not visible on the display device. In response to the data of a cell outside of the sub-table changing, such that the cell is not visible on the display device, an indicator is displayed in the cell of the sub-table that is visible that is closest within the table to the cell having the data that changed.

19 Claims, 7 Drawing Sheets

(56) References Cited

U.S. PATENT DOCUMENTS

| | | | |
|---|---|---|---|
| 2003/0188256 A1* | 10/2003 | Aureglia | G06F 17/246 715/214 |
| 2003/0188259 A1* | 10/2003 | Aureglia | G06F 17/246 715/214 |
| 2004/0055007 A1* | 3/2004 | Allport | H04N 5/44543 725/39 |
| 2004/0107312 A1* | 6/2004 | Ruetsch | G06F 17/5018 711/113 |
| 2005/0044496 A1* | 2/2005 | Kotler | G06F 17/211 715/225 |
| 2005/0223337 A1* | 10/2005 | Wheeler | G06F 3/04845 715/806 |
| 2006/0080594 A1* | 4/2006 | Chavoustie | G06F 17/246 715/218 |
| 2009/0083676 A1* | 3/2009 | Flanagan | G06F 16/248 715/853 |
| 2009/0193361 A1* | 7/2009 | Lee | G06F 3/04886 715/810 |
| 2010/0205520 A1* | 8/2010 | Parish | G06F 17/246 715/212 |
| 2010/0241516 A1* | 9/2010 | Kim | G06Q 30/0277 705/14.73 |
| 2011/0307772 A1* | 12/2011 | Lloyd | G06F 17/246 715/212 |
| 2013/0117651 A1* | 5/2013 | Waldman | G06F 17/246 715/220 |
| 2013/0117714 A1* | 5/2013 | Rhee | G06F 17/245 715/823 |
| 2014/0033101 A1* | 1/2014 | Rein | G06F 17/30575 715/771 |
| 2014/0068403 A1* | 3/2014 | Bhargav | G06F 17/246 715/212 |
| 2014/0082470 A1* | 3/2014 | Trebas | G06F 17/2229 715/217 |
| 2014/0164896 A1* | 6/2014 | Schlereth | G06F 17/246 715/217 |
| 2014/0372855 A1* | 12/2014 | Myerscough | G06F 17/246 715/220 |
| 2015/0012843 A1* | 1/2015 | Ouyang | H04L 65/403 715/753 |
| 2015/0019946 A1* | 1/2015 | Zarras | G06F 17/246 715/219 |
| 2015/0121238 A1* | 4/2015 | Lee | H04L 67/06 715/738 |

* cited by examiner

DISPLAYING INDICATOR WHEN DATA OF CELL THAT IS NOT VISIBLE CHANGES

BACKGROUND

Data is the lifeblood of many entities like businesses and governmental organizations, as well as individual users. It is not uncommon for data to be organized over cells of a grid within rows and columns. For example, individual records of data may have values for each of a number of different fields. In the grid, each row can correspond to a different record, and each column can correspond to a different field.

SUMMARY

An example method includes displaying, by a computing device on a display device, a sub-grid of a grid of data organized over cells within columns and within rows. The cells within the sub-grid are visible on the display device. The cells outside the sub-grid are not visible on the display device. The method includes, in response to the data of a cell outside of the sub-grid changing, such that the cell is not visible on the display device, displaying, by the computing device on the display device, an indicator in the cell of the sub-grid that is visible that is closest within the grid to the cell having the data that changed.

An example non-transitory computer-readable data storage medium stores computer-executable code that when executed by a computing device causes the computing device to perform a method. The method includes displaying a sub-table of a table of data on a display device. The data is organized over cells. The cells within the sub-table are visible on the display device, and the cells outside the sub-table are not visible on the display device. The method includes, in response to the data of a cell outside of the sub-table changing, such that the cell is not visible on the display device, displaying an indicator in the cell of the sub-table that is visible that is closest within the table to the cell having the data that changed.

An example system includes a display device to display a sub-array of an array of data. The data is organized over cells. The cells within the sub-array are visible on the display device and the cells outside the sub-array are not visible on the display device. The system includes a processor and a memory. The memory is to store computer-executable code that the processor executes to, in response to the data of a cell outside of the sub-array changing, such that the cell is not visible on the display device, display an indicator in the cell of the sub-array that is visible that is closest within the array to the cell having the data that changed.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a grid of data may be organized over cells within rows and columns. For example, a spreadsheet application program organizes data in such a manner. As another example, information technology monitoring programs can organize data in such a manner, where each row corresponds to a different unit to be managed, such as a server computing device. Each column corresponds to a different field, such as various attributes pertaining to a server.

For large sets of data, the portion of the grid that may be displayed on a display device can be limited to a sub-grid of the grid—that is, a number of contiguous columns and/or rows lesser than the total number of columns and/or rows of the grid itself. A user may be able to control the display of the information to "zoom out" to view a larger portion of the grid at a given time on the display device, but if the display device is relatively small and/or if the grid has a relatively large number of columns and/or rows, readability may be difficult or impossible. This is problem is exacerbated with the increasing popularity of mobile computing devices like smartphones, which have much smaller screens than even small desktop or laptop computer screens. Therefore, typically programs afford users the ability to scroll horizontally to view different columns for the currently displayed rows, as well as to scroll vertically to view different rows for the currently displayed columns.

One problem in being unable to view the entire grid of data on a display device at one time is that data within a cell that is not currently displayed (i.e., located in a column and/or row that is not currently displayed) may dynamically change without the user realizing this. In spreadsheet programs, for instance, cells of data can be calculations based on the values of other cells of data. If a user changes a currently displayed cell's data, a different data cell that is not currently visible may change without the user knowing. As another example, in monitoring programs, an attribute of a unit of a server, such as its failure state, low memory warning state, and so on, may change without the user's realization if the attribute is displayed in a cell that is not currently visible on the display device.

Techniques disclosed herein resolve this problem, by displaying an indicator when the data of a cell that is not currently visible changes. The indicator is specifically displayed in the cell of the sub-grid that is currently displayed on the display device that is closest within the grid to the cell having the data that changed. For example, if the cell in which data has changed is within a row that is visible on the display device, the indicator can be displayed in the left-most or right-most cell of the sub-grid in the same row that is closet to the cell having the changed data. Similarly, if the cell in which the data has changed is within a column that is visible on the display device, the indicator can be displayed in the top-most or bottom-most cell of the sub-grid in the same column that is closet to the cell having the changed data. If the cell in which the data has changed is within a column and a row that neither of which is currently visible on the display device, the indicator can be displayed in the corner cell of the sub-grid that is closest to the cell having the changed data. The indicator can be a change in background color of a cell, or another type of indicator.

In addition to the indicator, a selectable element (or elements) may be displayed. If the user selects the element, such as by clicking on the element using a pointing device like a mouse or a touchpad, or such as by tapping on the element using a touchscreen, the cells of the row including the cell in which the data has changed may be temporarily displayed in an overlaid manner on the currently displayed sub-grid, until the user selects any of these newly displayed cells. In another implementation, if the user selects the element, the sub-grid is scrolled horizontally and/or vertically in relation to the grid so that the cell in which the data has changed becomes part of the sub-grid and thus is displayed on the display device. These two implementations can be combined by having two selectable elements, one for each behavior.

Figure 1:
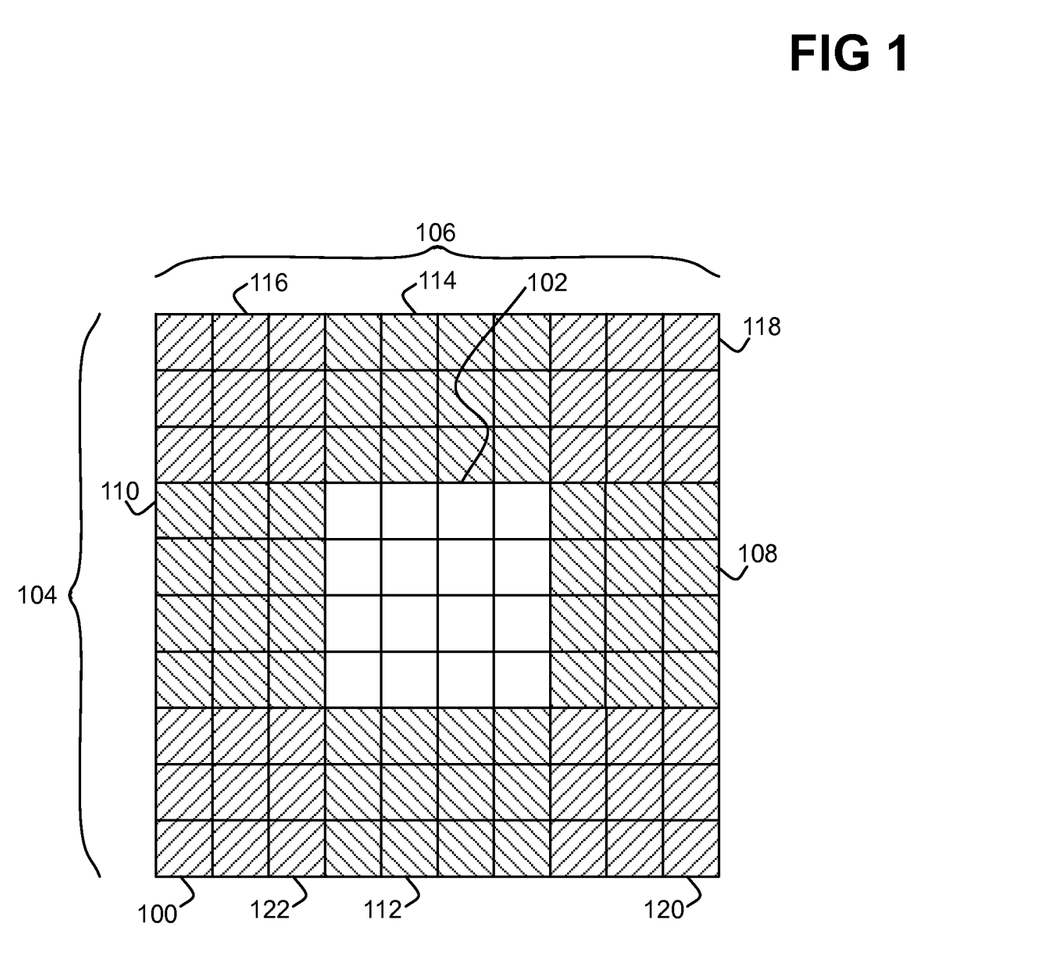
FIG. 1 is a diagram of an example grid of data organized over cells within rows and columns, of which a sub-grid of data is currently displayed on a display device.

FIG. 1 shows an example grid 100 of data organized in cells within rows 104 and columns 106. A sub-grid 102 of the grid 100 is currently displayed on a display device. Therefore, cells within the sub-grid 102 are visible on the display device. Cells outside the sub-grid 102 are not currently displayed and thus not visible on the display device. The grid 100 can also be referred to as a table or an array, and likewise the sub-grid 102 can also be referred to as a sub-table or a sub-array. In the example of FIG. 1, the grid 100 includes ten rows 104 and ten columns 106, and the sub-grid 102 includes four rows 104 and four columns 106. However, this is just for example and illustrative purposes, and there can be more or less rows and/or columns within the grid 100 and/or the sub-grid 102.

The cells outside the sub-grid 102 are shaded in FIG. 1 just to denote their location relative to the sub-grid 102. The cells 108 are directly to the right of the sub-grid 102, and are within rows 104 that have cells that are within the sub-grid 102. Similarly, the cells 110 are directly to the left of the sub-grid 102, and are within rows 104 that have cells that are within the sub-grid 102. The cells 112 are directly below the sub-grid 102, and are within columns 106 that have cells that are within the sub-grid 102. Similarly, the cells 114 are directly above the sub-grid 102, and are within columns 106 that have cells that are within the sub-grid 102. The cells 116 are to the left and above the sub-grid 102; the cells 118 are to the right and above the sub-grid 102; the cells 120 are to the right and below the sub-grid 102; and the cells 122 are to the left and below the sub-grid 102. The cells 116, 118, 120, and 122 are within rows 104 and columns 106 that have no cells that are within the sub-grid 102.

Figure 2:
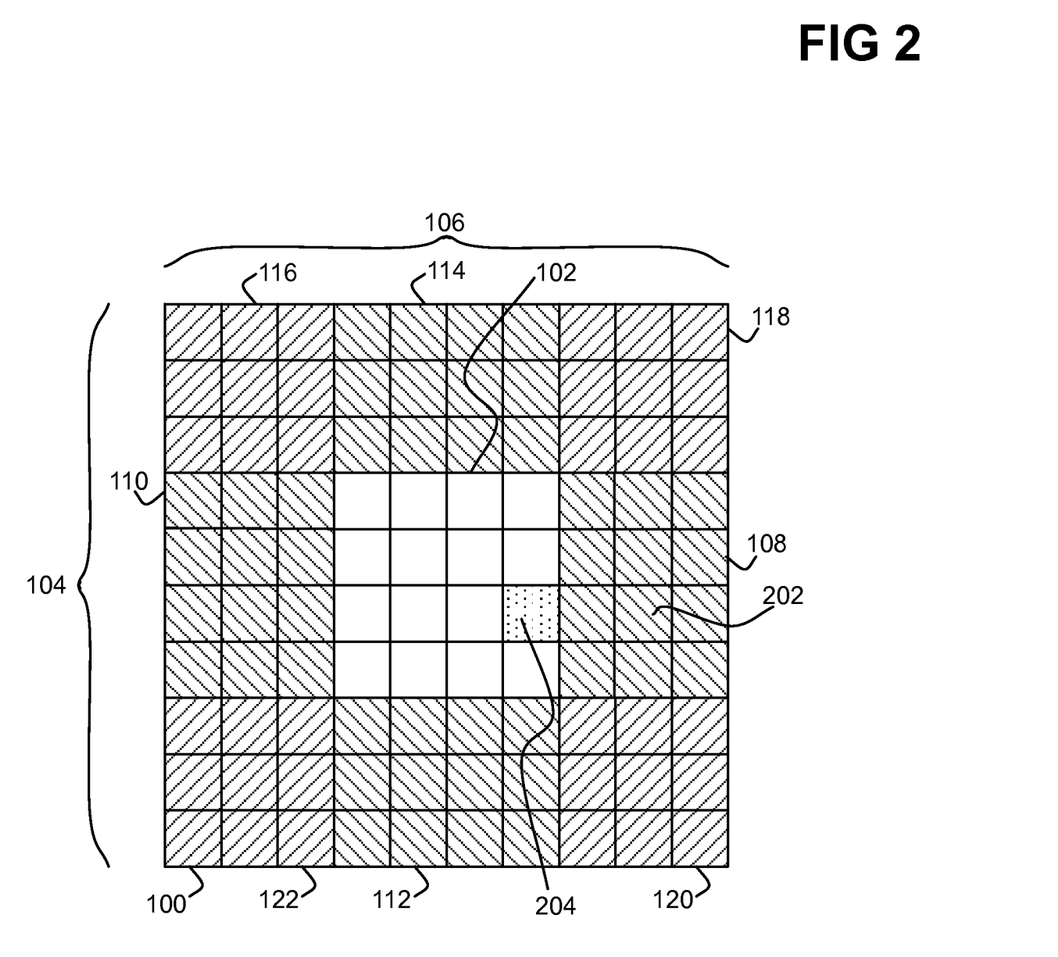
FIG. 2 is a diagram depicting an example of a visual indicator displayed in a closest cell of a sub-grid when data in a cell directly to the right of the sub-grid changes.

FIG. 2 shows an example in which a cell 202 of the cells 108 directly to the right of the sub-grid 102 and within rows 104 that have cells that are within the sub-grid 102 has its data changed. In particular, a visual indicator is displayed in the cell 204 within the sub-grid 102. The visual indicator can be the background color of the cell 204 changing, which is depicted in FIG. 2 via shading. The cell 204 is the closest cell within the sub-grid 102 to the cell 202 in which data has changed. Because the cell 202 is directly to the right of the sub-grid 102, the cell 204 is thus the right-most cell within the sub-grid 102 in the same row 104. By comparison, if a cell has its data changed that is directly to the left of the sub-grid 102, and thus one of the cells 110, the left-most cell within the sub-grid 102 that is in the same row 104 would have a visual indicator displayed therein.

Figure 3:
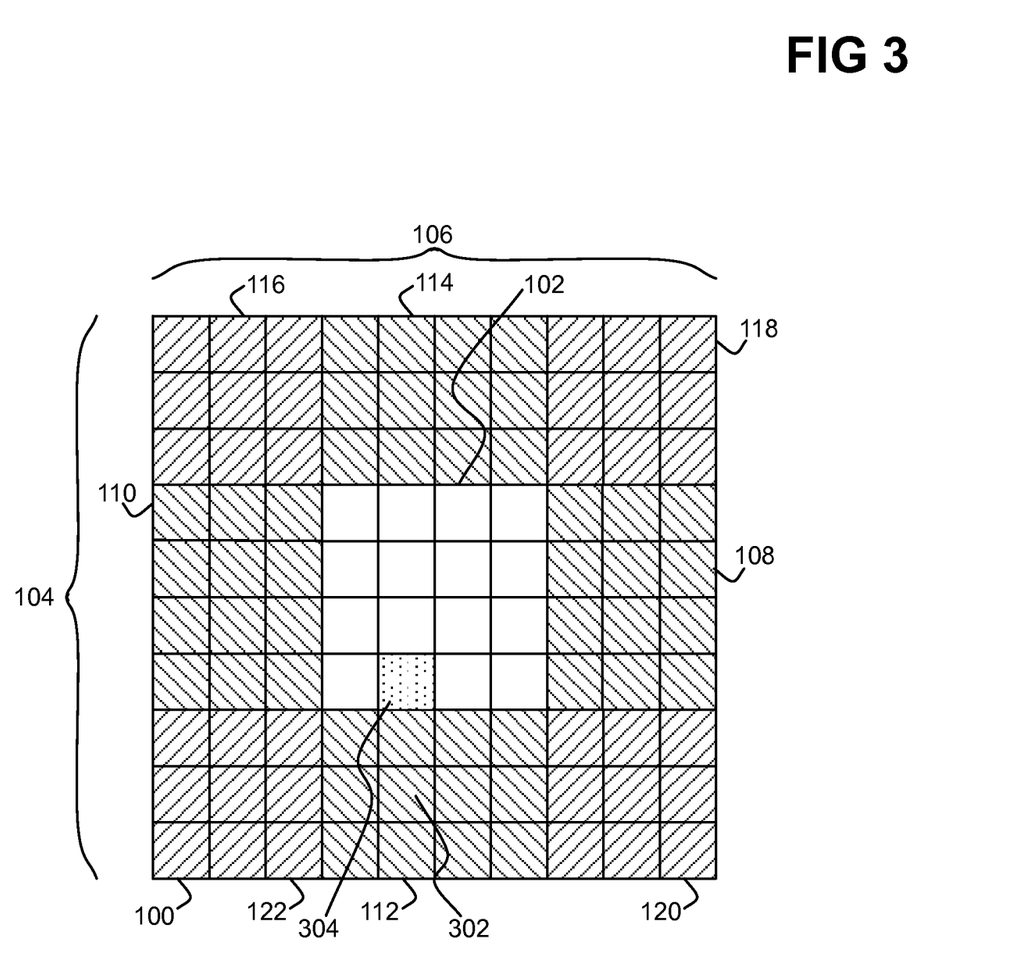
FIG. 3 is a diagram depicting an example of a visual indicator displayed in a closest cell of a sub-grid when data in a cell directly below the sub-grid changes.

FIG. 3 shows an example in which a cell 302 of the cells 112 directly below the sub-grid 102 and within columns 106 that have cells that are within the sub-grid 102 has its data changed. In particular, a visual indicator is displayed in the cell 304 within the sub-grid 102. As in FIG. 2, the visual indicator can be the background color of the cell 304 changing, which is depicted in FIG. 3 via shading. The cell 304 is the closest cell within the sub-grid 102 to the cell 302 in which data has changed. Because the cell 302 is directly below the sub-grid 102, the cell 304 is thus the bottom-most cell within the sub-grid 102 in the same column 106. By comparison, if a cell has its data changed that is directly above the sub-grid 102, and thus one of the cells 114, the top-most cell within the sub-grid 102 that is in the same column 106 would have a visual indicator displayed therein.

Figure 4:
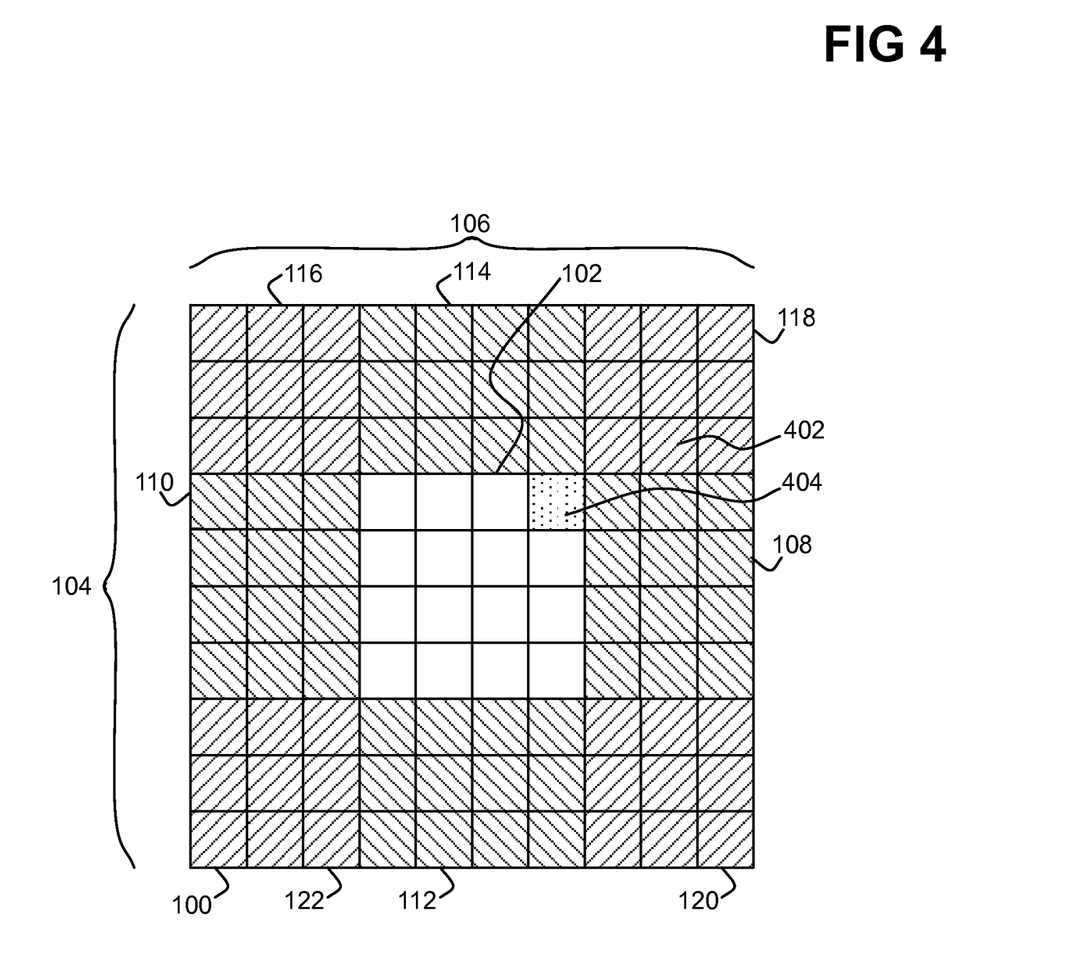
FIG. 4 is a diagram depicting an example of a visual indicator displayed in a closest cell of a sub-grid when data in a cell to the right and above the sub-grid changes.

FIG. 4 shows an example in which a cell 402 of the cells 118 to the right and above the sub-grid 102 and within rows 104 and columns 106 that have no cells that are within the sub-grid 102 has its data changed. In particular, a visual indicator is displayed in the cell 404 within the sub-grid 102. As in FIGS. 2 and 3, the visual indicator can be the background color of the cell 404 changing, which is depicted in FIG. 4 via shading. The cell 404 is the closest cell within the sub-grid 102 to the cell 402 in which data has changed. Because the cell 402 is to the right and above the sub-grid 102, the cell 404 is thus the upper-right corner cell within the sub-grid 102. By comparison, if a cell has its data changed that is to the right and below the sub-grid 102, and thus one of the cells 120, the lower-right corner cell within the sub-grid 102 would have a visual indicator displayed therein. Similarly, if a cell has its data changed that is to the left and below the sub-grid 102, and thus one of the cells 122, the lower-left corner cell within the sub-grid 102 would have a visual indicator displayed therein. Likewise, if a cell has its data changed that is to the left and above the sub-grid 102, and thus one of the cells 116, the upper-left corner cell within the sub-grid 102 would have a visual indicator displayed therein.

In one implementation, once a visual indicator is displayed in one of the perimeter cells of the sub-grid 102, the indicator remains until a user has selected the cell in question. In another implementation, the visual indicator remains for at most a threshold length of time. Furthermore, in one implementation, at most one cell within the sub-grid 102 has a visual indicator displayed therein at any given time; if a cell of the sub-grid 102 has a visual indicator displayed therein and another cell of the sub-grid 102 is to have a visual indicator displayed therein, then the visual indicator is automatically removed from the former cell in this implementation.

In another implementation, more than one cell within the sub-grid 102 can have a visual indicator displayed therein at any given time. In this matter implementation, for instance, the data of two cells outside the sub-grid may change at the same time, in which case two visual indicators are displayed in corresponding cells of the sub-grid that are closest to these two cells. The corresponding cells may be the same if the two cells in which data has changed are in the same column and part of the same cells 112 or 114, in the same row and part of the same cells 108 and 110, or are part of the same cells 116, 118, and 120. Otherwise, each cell in which data has changed has a different corresponding cell in the sub-grid 102 in which an indicator is displayed. A user may be able to specify these visual indicator behaviors described in this and the prior paragraph.

A user may further be able to specify the cells that when data has changed therein trigger the display of visual indicators within the sub-grid 102. The granularity of this specification may be on a per-cell basis in one implementation. In another implementation, the user may specify the cells that when data has changed therein trigger the display of visual indicators within the sub-grid 102 on a less granular basis. For instance, the user may specify the cells 108 as a whole, the cells 110 as a whole, the cells 112 as a whole, the cells 114 as a whole, the cells 116 as a whole, the cells 118 as a whole, the cells 120 as a whole, and/or the cells 122 as a whole. As a particular example, the user may specify just any of the cells 108 or 110 having changed data triggers the display of visual indicators within the sub-grid 102. When any of the cells 112, 114, 116, 118, or 120 changes in this example, no visual indicator is displayed within the sub-grid 102. The various implementations may further be combined: for instance, a user may specify that any of the cells 108 or 110 having changed triggers the display of visual indicators within the sub-grid 102, and also that a particular cell of the cells 112 triggers the display of a visual indicator within the sub-grid 102.

Figure 5:
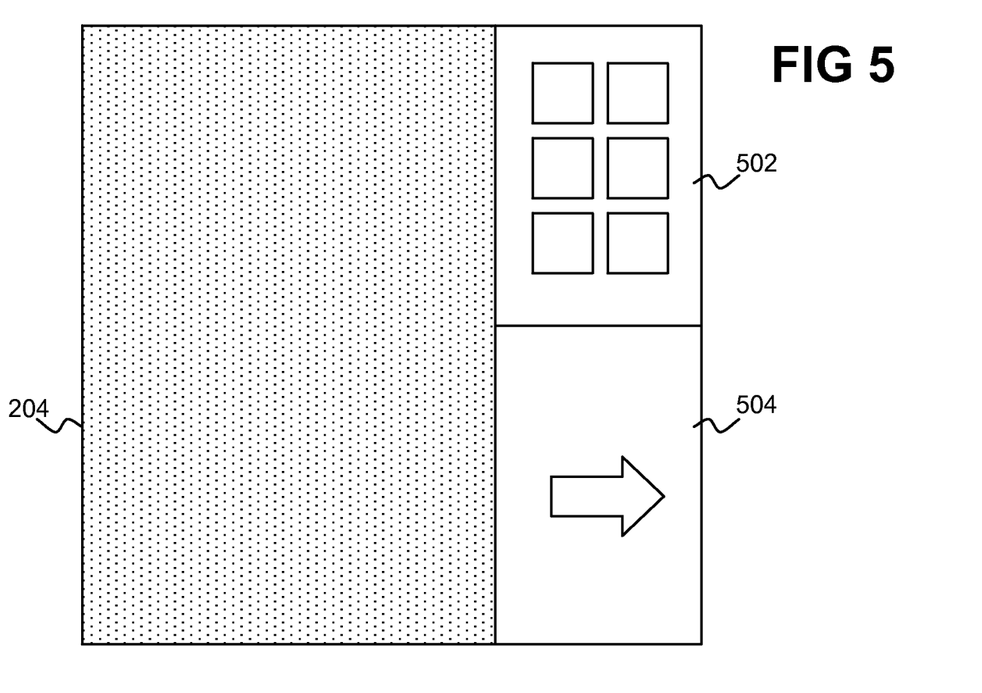
FIG. 5 is a diagram depicting example selectable elements that are displayed in a closest cell of a sub-grid when data in a cell has changed.

FIG. 5 shows an example of selectable elements 502 and 504 that can be displayed in the cell 204 responsive to the data changing in the cell 202 of FIG. 2, in addition to the visual indicator. Although there are two selectable elements 502 and 504, in another implementation there may be just one selectable element. A user can select a selectable element 502 or 504 to cause different functionality to be performed, as is now described in detail.

Figure 6A:
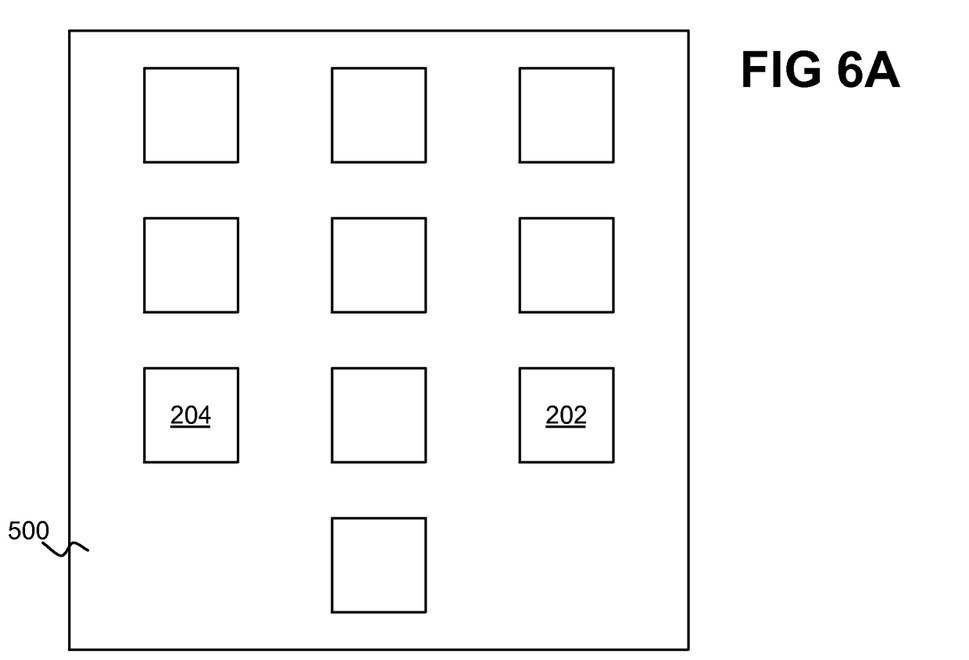
FIG. 6A is a diagram depicting an example when a user selects a visual indicator that is displayed when data in a cell has changed.

FIG. 6A shows an example when the user selects the selectable element 502 of FIG. 5. In the example of FIG. 6A, the cells 600 are displayed overlaid and in an enlarged fashion on the sub-grid 102. The particular cells of the sub-grid 102 are not shown in FIG. 6A for illustrative clarity. The cells 600 are the cells within the same row 104 as the cells 202 and 204, and thus include the cells 202 and 204. There are ten cells 600 in the example of FIG. 6A because there are ten cells in the same row 104 as the cells 202 and 204.

When the data of the cells within a row 104 corresponds to a particular record or unit, the implementation of FIG. 6A thus permits the user to quickly see all the data related to that record or unit, including the data within the cell 202 that changed and that was not displayed on the display device within the sub-grid 102. In one implementation, the temporary display of the cells 600 is removed after a threshold length of time. In another implementation, the temporary display of the cells 600 is removed when the user selects any of the cells 600 overlaid on the sub-grid 102.

The example of FIG. 6A is particular to FIG. 2, in which the cell 202 in which data has changed in the same row as the cell 204 of the sub-grid 102, but is extendible to the scenarios of FIGS. 3 and 4 as well. When the cell 302 in which data has changed is in the same column as the cell 304 in the sub-grid 102, per FIG. 3, the cells 600 that may be displayed may be the cells that are within this column, or in another implementation they can be the cells that are within the same row as the cell 302. The latter implementation may be desired if a row of data corresponds to a given record or unit. Similarly, when the cell 402 in which data has changed is not in a row or column that is visible in the sub-grid 102, per FIG. 4, the cells 600 that may be displayed may be the cells that are within the row or column of the cell 402.

Figure 6B:
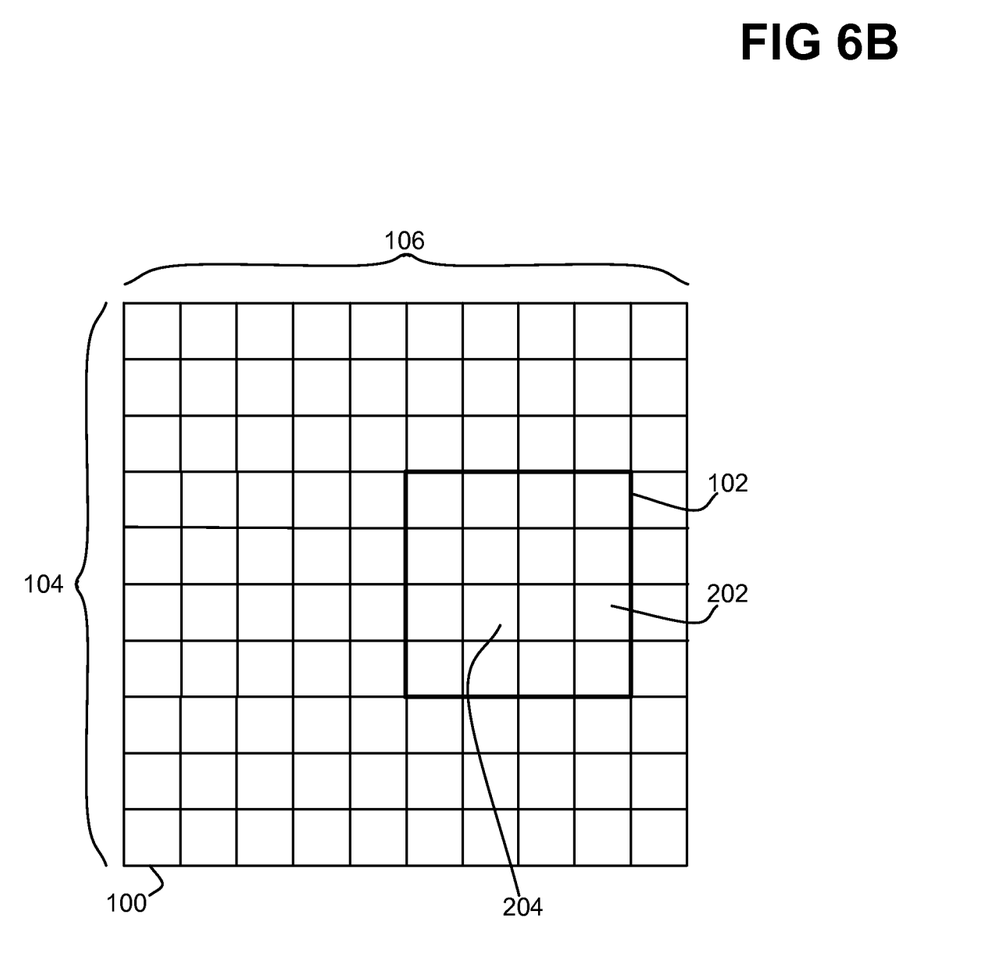
FIG. 6B is a diagram depicting another example when a user selects a visual indicator that is displayed when data in a cell has changed.

FIG. 6B shows an example when the user selects the selectable element 504 of FIG. 5. In the example of FIG. 6B, the sub-grid 102 scrolls relative to the grid 100 so that the sub-grid 102 includes the cell 202 in which data has changed. As such, the cell 202 is displayed on the display device and is visible to the user. The implementation of FIG. 6B thus permits the user to quickly move to a cell within the grid 100 when data within the cell has changed and the user has selected the visual indicator that has been displayed.

In the particular example of FIG. 6B, the sub-grid 102 scrolls in a rightward direction in relation to the grid 100 to include the cell 202 in which data has changed, which is why the selectable element 504 shows a rightward-pointing arrow. If the cell in which data has changed were directly to the left of the sub-grid 102, then the sub-grid 102 would scroll in a leftward direction relative to the grid 100 to include the cell in which data has changed, and the selectable element 504 would show a leftward-pointing arrow. Similarly, as to FIG. 3, the sub-grid 102 would scroll in a downward direction in relation to the grid 100 to include the cell 302 in which data has changed, and the selectable element 504 would show a downward-pointing arrow. If the cell in which data has changed were directly above the sub-grid 102, then the sub-grid would scroll in an upward direction relative to the grid 100 to include the cell in which data has changed, and the selectable element 504 would show an upward-pointing arrow.

Similarly, as to FIG. 4, the sub-grid 102 would scroll in an upward and rightward direction in relation to the grid 100 to include the cell 402 in which data has changed, and the selectable element 504 would show an arrow that points upward and rightward. If the cell in which data has changed were below and to the right of the sub-grid 102, then the sub-grid would scroll in a downward and rightward direction in relation to the grid 100 to include the cell in which data has changed, and the selectable element 504 would show an arrow that points downward and rightward. If the cell in which data has changed were below and to the left of the sub-grid 102, then the sub-grid would scroll in a downward and leftward direction relative to the grid 100 to include the cell in which data has changed, and the selectable element 504 would show an arrow that points downward and leftward. If the cell in which data has changed were above and to the left of the sub-grid 102, then the sub-grid would scroll in an upward and leftward direction relative to the grid 100 to include the cell in which data has changed, and the selectable element 504 would show an arrow that points upward and leftward.

As noted above, just one of the two selectable elements 502 and 504 may be displayed. In such an implementation, the functionality that is performed when selecting the selectable element may be that described in relation to FIG. 6A or that described in relation to FIG. 6B. Which functionality is performed may be able to be specified by the user. In the implementation in which both selectable elements 502 and 504, by comparison, both the functionality of FIGS. 6A and 6B can be triggered by selecting the appropriate element 502 or 504.

Figure 7:
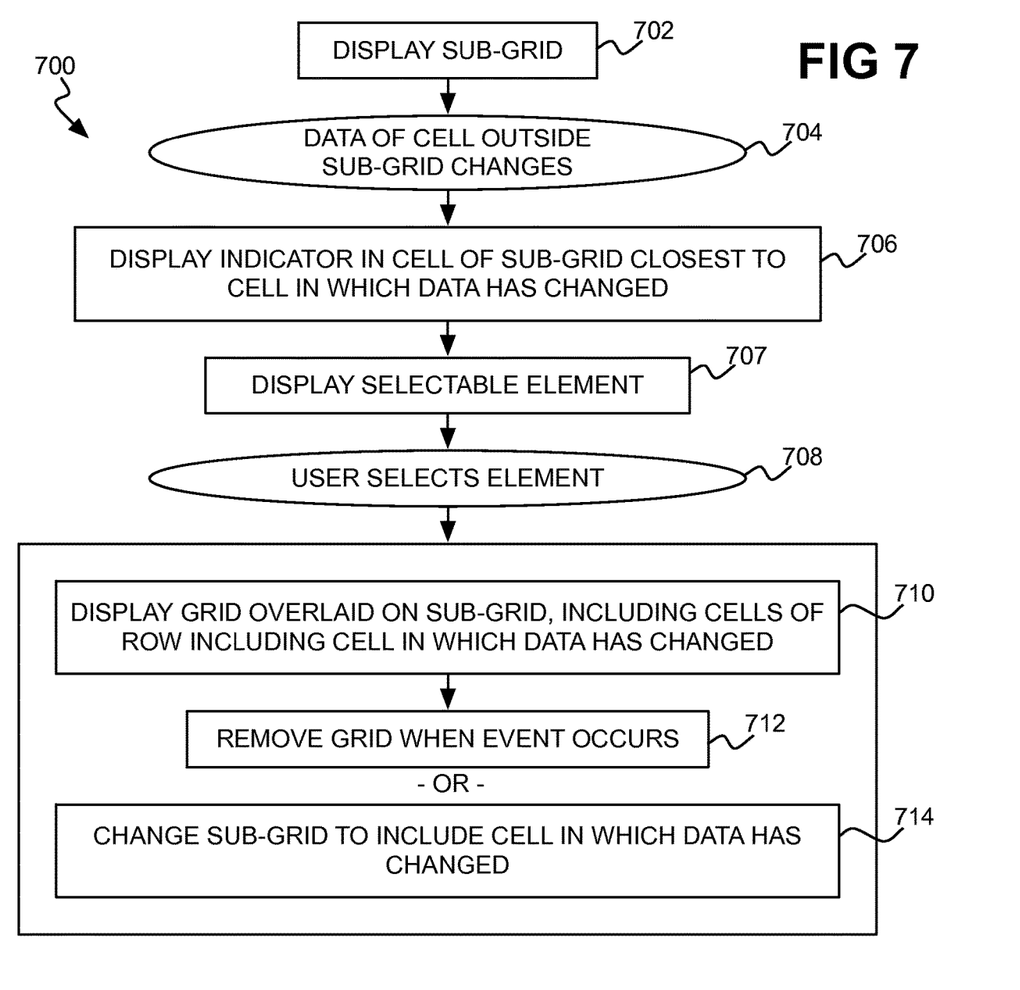
FIG. 7 is a flowchart of an example method.

FIG. 7 shows an example method 700 of the techniques that have been described above. The method 700 can be implemented as computer-executable code stored on a non-transitory computer-readable data storage medium. Execution of the code by a processor of a computing device causes the method 700 to be performed. The sub-grid 102 of the grid 100 is displayed on a display device (702). The sub-grid 102 displays a portion of the cells of data of the grid 100. As such, data cells outside the sub-grid 102 are not currently displayed on the display device.

The data of a cell outside of the sub-grid 102 and that is not currently displayed on the display device changes (704). In response, an indicator is displayed in the cell of the sub-grid 102 that is closest to the cell in which the data has changed (706), as has been described above in relation to FIGS. 2, 3, and 4. One or two selectable elements may also be displayed in this cell of the sub-grid 102 (707), as has been described above in relation to FIG. 5. The user may select a selectable element (708). In response to the user selecting the indicator, parts 710 and 712 can be performed, or part 714 can be performed, depending on which selectable element has been selected, or if just one selectable element is displayed, depending on the functionality configured to be triggered when the element is selected.

In the former, an additional (different) grid is overlaid on the sub-grid 102 (710). As has been described above in relation to FIG. 6A, the grid can include the cells 600 of the row including the cell in which data has changed. More generally, at least the cell in which data has changed is displayed. Once an event occurs, the grid of the cells 600 is removed (712). The event may be, for instance, a duration of time having elapsed, or the user selecting on any of the cells 600.

In the latter, the sub-grid 102 is said to be changed to include the cell in which data has changed (714). That is, the cells of the grid 100 that are displayed in the sub-grid 102 changes to include the cell in which data has changed. As has been described above in relation to FIG. 6B, the sub-grid 102 can scroll relative to the grid 100 to include the cell in which data has changed. Such scrolling can be akin to the user scrolling the cells of the grid 100 that are currently displayed on the display device (i.e., the cells of the sub-grid 102), but is performed automatically.

Figure 8:
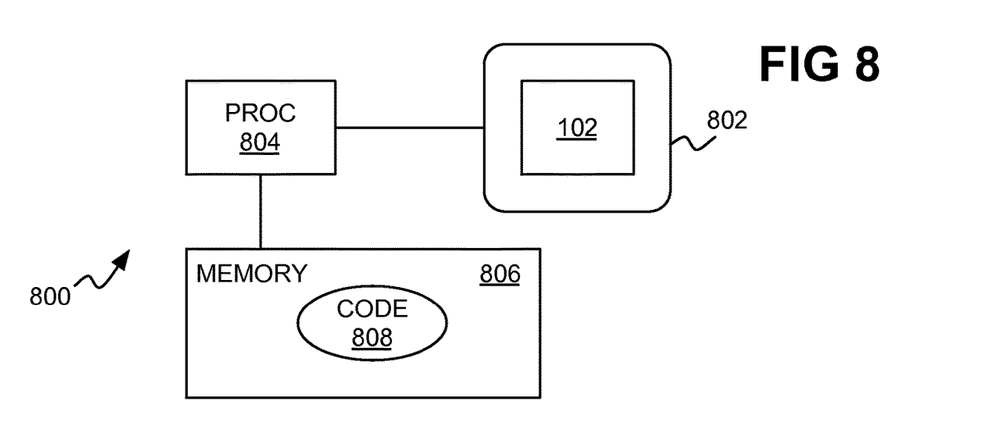
FIG. 8 is a diagram of an example system.

FIG. 8 shows an example system 800 by which the techniques that have been described above can be implemented. The system 800 can be or can be a part of a computing device, such as a desktop or laptop computer, a mobile computing device like a smartphone, and so on. The system 800 includes a display device 802, a processor 804, and a memory 806. The display device 802 may be a part of the computing device in question, such as when the computing device is an all-in-one desktop computer, a laptop computer, or a mobile computing device like a smartphone. The display device 802 displays the sub-grid 102 of the grid 100 of data. The processor 804 can be a general-purpose processor, such as a central processing unit (CPU). The memory 806, which may be a non-volatile or a volatile memory device, and stores computer-executable code 808. The processor 804 executes the code 808 to perform the method 700 that has been described.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:

displaying, by a computing device on a display device, a sub-grid of a grid of data organized over a plurality of cells within a plurality of columns and within a plurality of rows, the cells within the sub-grid visible on the display device, wherein the cells, including the data thereof, outside the sub-grid not visible on the display device;

in response to the data of a cell outside of the sub-grid and that is not currently visible on the display device changing, displaying, by the computing device on the display device, an indicator in a cell of the sub-grid that is visible and that is closest within the grid to the cell having the data that changed, the indicator indicating that the data of the cell outside of the sub-grid and that is not currently visible on the display device has changed;

displaying, by the computing device on the display device, a selectable element; and in response to receiving user selection of the selectable element, displaying, by the computing device on the display device, an additional grid overlaid on the sub-grid, the additional grid being of the cells of the row or the column in which both the cell having the data that changed and the cell in which the indicator has been displayed are located.

2. The method of claim 1, wherein displaying the indicator comprises:

when the cell with data that has changed is within a row having one or more cells within the sub-grid that is visible on the display device, displaying the indicator in a cell of the sub-grid that is visible on the display device and that is located in the row in which the cell having the data that changed is located and in a column of the sub-grid closest to the cell having the data that changed.

3. The method of claim 1, further comprising, in response to receiving user selection of any cell within the additional grid, removing, by the computing device on the display device, the additional grid, such that the additional grid is no longer displayed.

4. The method of claim 1, wherein the selectable element is a first selectable element, the method further comprising:

displaying, by the computing device on the display device, a second selectable element; and in response to receiving user selection of the second selectable element, displaying, by the computing device on the display device, the cell having the data that changed overlaid on the sub-grid.

5. The method of claim 1, wherein the selectable element is a first selectable element, the method further comprising:

displaying, by the computing device on the display device, a second selectable element; and in response to receiving user selection of the second selectable element, changing, by the computing device, the sub-grid that is visible on the display device to include the cell having the data that changed, such that the cell becomes visible on the display device.

6. The method of claim 5, wherein changing the sub-grid to include the cell having the data that changed comprises:
when the indicator is displayed in a right-most column of the sub-grid, scrolling the sub-grid in a rightward direction in relation to the grid so that the cell having the data that changed is visible on the display device; and
when the indicator is displayed in a left-most column of the sub-grid, scrolling the sub-grid in a leftward direction in relation to the grid so that the cell having the data that changed is visible on the display device.

7. The method of claim 1, wherein displaying the indicator comprises:
when the cell with data that has changed is within a column having one or more cells within the sub-grid that is visible on the display device, displaying, by the computing device on the display device, the indicator in a cell of the sub-grid that is visible on the display device and that is located in the column in which the cell having the data that changed is located and in a row of the sub-grid closest to the cell having the data that changed.

8. The method of claim 7, wherein the selectable element is a first selectable element, the method further comprising:
displaying, by the computing device on the display device, a second selectable element; and
in response to receiving user selection of the second selectable element, changing, by the computing device, the sub-grid that is visible on the display device to include the cell having the data that changed, such that the cell becomes visible on the display device, by:
when the indicator is displayed in a bottom-most row of the sub-grid, scrolling the sub-grid in a downward direction in relation to the grid so that the cell having the data that changed is visible on the display device; and
when the indicator is displayed in a top-most row of the sub-grid, scrolling the sub-grid in an upward direction in relation to the grid so that the cell having the data that changed is visible on the display device.

9. The method of claim 1, wherein displaying the indicator comprises:
when the cell with data that has changed is not within a column having one or more cells within the sub-grid that is visible on the display device and is not within a row having one or more cells within the sub-grid that is visible on the display device, displaying, by the computing device on the display device, the indicator in a cell of the sub-grid that is visible on the display device and that is located in a column of the sub-grid closest to the cell having the data that changed and in a row of the sub-grid closest to the cell having the data that changed.

10. The method of claim 9, wherein the selectable element is a first selectable element, the method further comprising:
displaying, by the computing device on the display device, a second selectable element; and
in response to receiving user selection of the second selectable element,
changing, by the computing device, the sub-grid that is visible on the display device to include the cell having the data that changed, such that the cell becomes visible on the display device, by:
when the indicator is displayed in an upper-left cell of the sub-grid, scrolling the sub-grid in an upward and leftward direction in relation to the grid so that the cell having the data that changed is visible on the display device;
when the indicator is displayed in an upper-right cell of the sub-grid, scrolling the sub-grid in an upward and rightward direction in relation to the grid so that the cell having the data that changed is visible on the display device;
when the indicator is displayed in a lower-left cell of the sub-grid, scrolling the sub-grid in a downward and leftward direction in relation to the grid so that the cell having the data that changed is visible on the display device; and
when the indicator is displayed in a lower-right cell of the sub-grid, scrolling the sub-grid in a downward and rightward direction in relation to the grid so that the cell having the data that changed is visible on the display device.

11. The method of claim 1, wherein the cell outside of the sub-grid that changes is a first cell and the indicator is a first indicator, wherein a second cell outside the sub-grid has data that changes at a same time as the data of the first cell, and wherein the method further comprises:
in response to the data of the of the second cell changing, such that the second cell is not visible on the display device,
displaying, by the computing device on the display device, a second indicator in the cell of the sub-grid that is visible and that is closest within the grid to the second cell.

12. A non-transitory computer-readable data storage medium storing computer-executable code that when executed by a computing device causes the computing device to perform a method comprising:
displaying a sub-table of a table of data on a display device, the data organized over a plurality of cells, the cells within the sub-table visible on the display device, wherein the cells, including the data thereof, outside the sub-grid not visible on the display device;
in response to the data of a cell outside of the sub-table and that is not currently visible on the display device changing, displaying an indicator in a cell of the sub-table that is visible and that is closest within the table to the cell having the data that changed, the indicator indicating that the data of the cell outside of the sub-table and that is not currently visible on the display device has changed;
displaying a selectable element; and
in response to receiving user selection of the selectable element, display an additional grid overlaid on the sub-grid, the additional grid being of the cells of the row or the column in which both the cell having the data that changed and the cell in which the indicator has been displayed are located.

13. The non-transitory computer-readable storage medium of claim 12, wherein the data is organized over the cells within a plurality of columns and within a plurality of rows,
wherein the cell having the data that changed is located within a row having one or more cells within the sub-table that is visible on the display device,
and wherein the indicator is displayed in a left-most or right-most cell of the sub-table in the row in which the cell having the data that changed is located.

14. The non-transitory computer-readable storage medium of claim 12, wherein the data is organized over the cells within a plurality of columns and within a plurality of rows,
   wherein the cell having the data that changed is located within a column having one or more cells within the sub-table that is visible on the display device,
   and wherein the indicator is displayed in a top-most or bottom-most cell of the sub-table in the column in which the cell having the data that changed is located.

15. The non-transitory computer-readable storage medium of claim 12, wherein the data is organized over the cells within a plurality of columns and within a plurality of rows,
   wherein the cell having the data that changed is not located within a column having one or more cells within the sub-table that is visible on the display device and is not located within a row having one or more cells within the sub-table that is visible on the display device,
   and wherein the indicator is displayed in a corner cell of the sub-table that is closest to the cell having the data that changed.

16. A system comprising:
   a display device to display a sub-array of an array of data, the data organized over a plurality of cells, the cells within the sub-array visible on the display device, wherein the cells, including the data thereof, outside the sub-grid not visible on the display device;
   a processor; and
   a memory to store computer-executable code that the processor executes to:
      in response to the data of a cell outside of the sub-array and not currently visible on the display device changing, display an indicator in a cell of the sub-array that is visible and that is closest within the array to the cell having the data that changed, the indicator indicating that the data of the cell outside of the sub-array and not currently visible on the display device has changed;
      display a selectable element; and
      in response to receiving user selection of the selectable element, display an additional grid overlaid on the sub-grid, the additional grid being of the cells of the row or the column in which both the cell having the data that changed and the cell in which the indicator has been displayed are located.

17. The system of claim 16, wherein the data is organized over the cells within a plurality of columns and within a plurality of rows,
   wherein the cell having the data that changed is located within a row having one or more cells within the sub-array that is visible on the display device,
   and wherein the indicator is displayed in a left-most or right-most cell of the sub-array in the row in which the cell having the data that changed is located.

18. The system of claim 16, wherein the data is organized over the cells within a plurality of columns and within a plurality of rows,
   wherein the cell having the data that changed is located within a column having one or more cells within the sub-array that is visible on the display device,
   and wherein the indicator is displayed in a top-most or bottom-most cell of the sub-array in the column in which the cell having the data that changed is located.

19. The system of claim 16, wherein the data is organized over the cells within a plurality of columns and within a plurality of rows,
   wherein the cell having the data that changed is not located within a column having one or more cells within the sub-array that is visible on the display device and is not located within a row having one or more cells within the sub-array that is visible on the display device,
   and wherein the indicator is displayed in a corner cell of the sub-array that is closest to the cell having the data that changed.

* * * * *